United States Patent [19]
Moeser

[11] 3,827,162
[45] Aug. 6, 1974

[54] COUNTING CUBE

[76] Inventor: Alan Moeser, 4 Homestead Ln., Roosevelt, N.J. 08555

[22] Filed: July 2, 1973

[21] Appl. No.: 375,365

[52] U.S. Cl............................ 35/32, 35/70, 273/160
[51] Int. Cl......................... G09b 1/10, G09b 19/02
[58] Field of Search....... 35/31 R, 31 D, 31 F, 31 G, 35/32, 70, 71, 72, 69; 273/156, 160

[56] References Cited
UNITED STATES PATENTS

| | | | |
|---|---|---|---|
| 756,625 | 4/1904 | Haefele | 35/71 |
| 3,381,394 | 5/1968 | Munro | 35/31 F |
| 3,612,537 | 10/1971 | Sato | 273/156 |
| 3,618,956 | 11/1971 | Biederer | 35/32 X |

*Primary Examiner*—Wm. H. Grieb

[57] ABSTRACT

A counting cube for teaching pre-schoolers how to recognize and count numbers. The cube is hollow and is provided with six faces, the bottom face serving as a base and the top and side faces having openings therein lying within sockets each having the shape of a respective numeral in a sequential set thereof. Also, provided are five pieces each having the shape of one of the numbers in the set and dimensioned to be received in a correspondingly-shaped socket. Projecting from the rear of each piece is a hollow stem which is insertable into the cube through the related opening, the stems all having the same length and extending along axes which intersect at a common point. Transverse holes are formed in the first four stems in the sequence to define cross-through passages for the intersecting stems whereby only when the pieces are socketed in direct sequence is it possible to mount all pieces on the cube.

6 Claims, 5 Drawing Figures

PATENTED AUG 6 1974

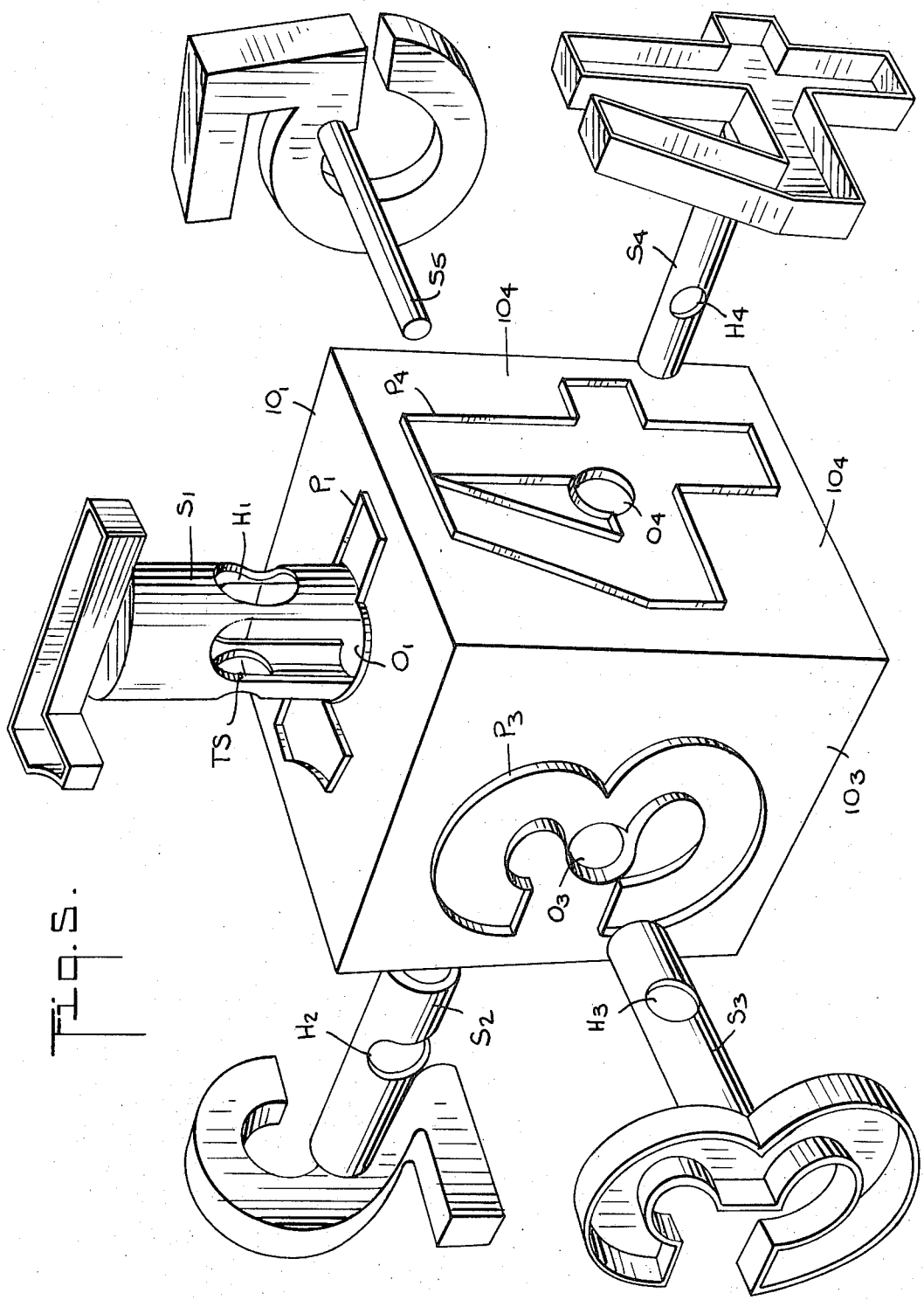

COUNTING CUBE

BACKGROUND OF THE INVENTION

This invention relates generally to educational toys and puzzles, and more particularly to a counting cube for preschool children in the form of a number locking block which facilitates the recognition of numerical symbols and teaches the counting of numbers in sequence.

The number is a basic element of mathematics. Numbers answer questions of how many and how much. The simplest are the whole or natural numbers denoted by the Arabic symbols 1, 2, 3 etc. In many primitive societies, the symbols for small numbers are mere repetitions of a basic mark. Thus 1 is represented by mark 1, two by 11, three by 111, four by 1111, and so on. A child who is able to relate numbers to the fingers of his hand has mastered this primitive system. But one virtue of the Arabic system of arithmetic which is used throughout all of Western civilization is that a separate, non-repetitive set of symbols is used to denote the numbers 0 to 9, all other numbers being formed by combining these basic symbols.

A child is expected to understand these symbols before entering school. It is not enough for a child to know the words for numbers, for he must also appreciate their significance. If, for example, a child is asked to bring two apples and three crayons to school, he must comprehend the amounts represented by these numbers.

When preschoolers first learn to count, they are taught to say the names of numbers. By the time preschoolers are ready to use numbers, they need to recognize the standard symbols for the names of the numbers and they need to be able to count using the symbols. The ability to count and use symbols to express amounts is fundamental to arithmetic.

As is well known, children learn best when knowledge or skills are imparted as an incident to play, for unless a child's interest is aroused he pays little attention to what is being taught. One cannot teach preschool children by lecturing them or by any other formal procedure, for it is necessary to involve the child in a game or in a play experience in the course of which the child acquires and refines certain skills in order to win or succeed.

SUMMARY OF THE INVENTION

In view of the foregoing, it is the main object of this invention to provide a counting cube for teaching preschoolers how to recognize and count numbers.

More specifically it is an object of this invention to provide a counting cube of the above-type which functions as a game or puzzle, success in the game depending on the ability of the player to mount pieces representing numbers onto five faces of the cube in proper sequence, and to withdraw the pieces in the reverse sequence, whereby in the course of play, the child acquires a knowledge of numerical symbols and their relationship to each other.

Also an object of the invention is to provide a counting cube which is of simple and safe design and which may be manufactured and sold at low cost.

Briefly stated these objects are attained in a structure constituted by a hollow cube having six like faces, the bottom face serving as a base and the top and side faces having openings therein lying within sockets each having the shape of a respective numeral in a sequential set (i.e., — 1 to 5). Also provided are five pieces each having the shape of one of the numbers in the set and dimensioned to be accommodated in a correspondingly-shaped socket. Hence the pieces cannot be seated until the child is able to match the shape of the piece with the shape of the socket.

Projecting from the rear of each piece is a hollow stem which is insertable into the cube through the related opening. The stems are of varying diameter and the related openings have diameters slightly larger than those of the stems for which they are intended. All stems have the same length and extend along axes in the cube which intersect at a common point. Transverse holes are formed in the first four stems in the sequence, the hole in each stem being placed to define a cross-through passage only for the next stem in the sequence whereby only when the pieces are socketed in direct numerical sequence is it possible to mount all pieces on the cube. The first four inserted stems are interlocked so that the pieces can only be retracted in the reverse sequence, starting with the fifth piece.

OUTLINE OF THE DRAWING

For a better understanding of the invention as well as other objects and further features thereof, reference is made to the following detailed description to be read in conjunction with the accompanying drawing, wherein:

FIG. 5 is the same as FIG. 1, but with the five pieces withdrawn from the cube.

DESCRIPTION OF THE INVENTION

Figure 1:
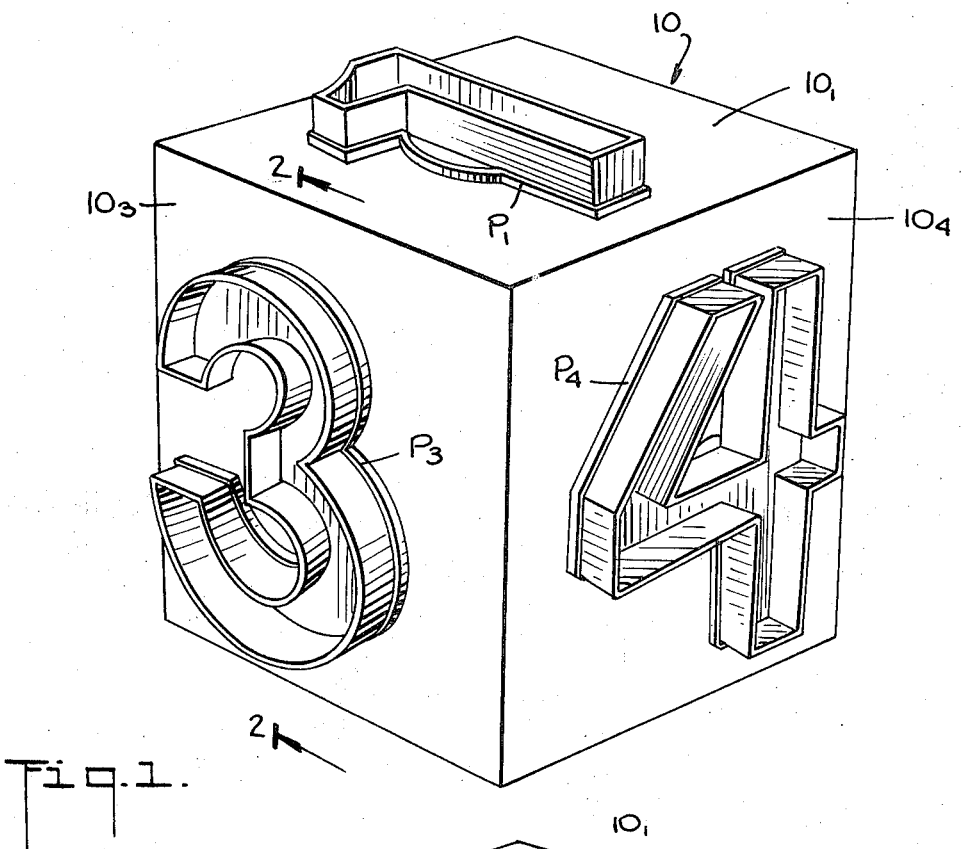
FIG. 1 is a perspective view of an educational toy in accordance with the invention, with the five pieces in place.

Referring now to the drawing, there is shown an educational toy in accordance with the invention, the toy being constituted by a hollow cube, generally designated by numeral 10 as having six like faces, $10_1$, $10_2$, $10_3$, $10_4$, $10_5$, and $10_6$. The bottom face $10_6$ of the cube serves as the base of the toy.

Also provided are five play pieces 1 to 5 having the configuration of the symbols of the numerals one to five. Each piece is provided with a tubular stem ($S_1$ to $S_5$), the stems being all of the same length but of progressively greater diameter in inverse relationship to their number. Thus stem $S_5$ of piece 5 has the smallest diameter and stem $S_1$ of piece 1 has the largest diameter. The entire structure is molded or otherwise fabricated of a suitable light-weight plastic material of acceptable structural strength.

Figure 2:
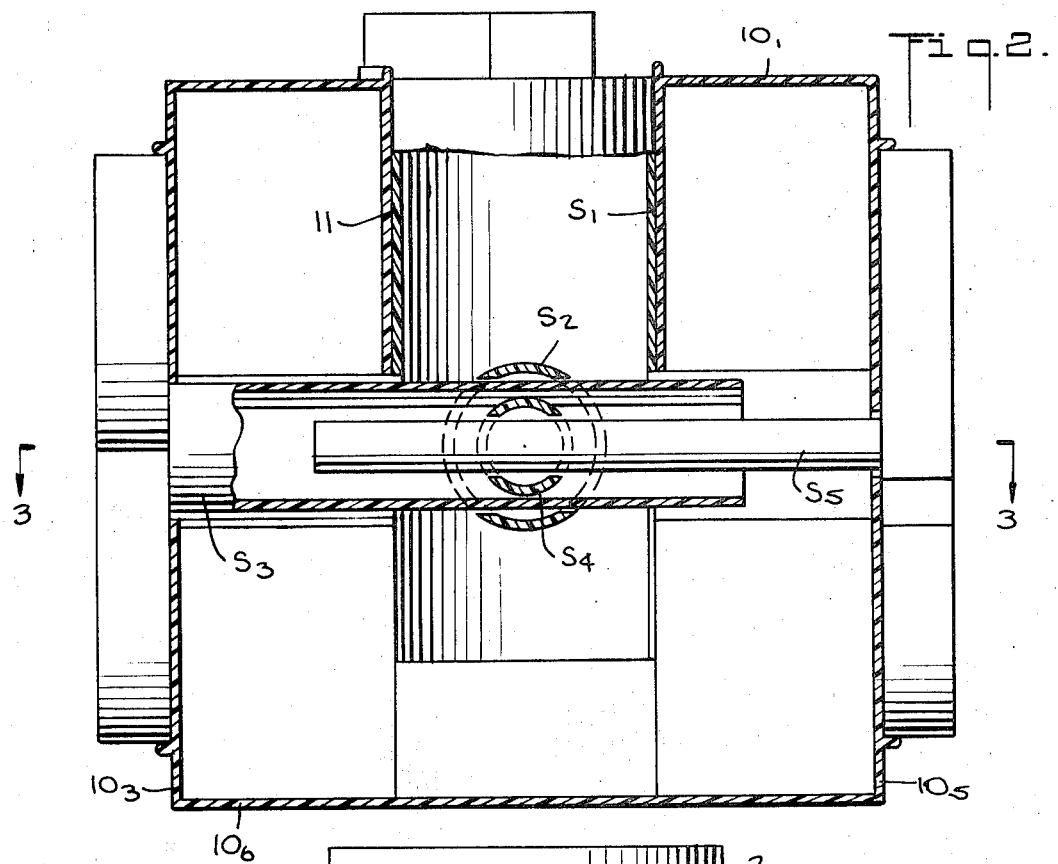
FIG. 2 is a section taken in the plane indicated by line 2—2 in FIG. 1.

The top face $10_1$ is provided with a central opening $0_1$ whose diameter is slightly greater than that of stem $S_1$ to permit the insertion thereof. Central openings $0_2$, $0_3$, $0_4$ and $0_5$ are formed respectively, in faces $10_2$, $10_3$, $10_4$ and $10_5$, each opening having a diameter slightly larger than the diameter of the related stem to permit the insertion thereof. The interior of the cube is provided, as shown in FIG. 2, with a cylindrical conduit 11 aligned with opening $0_1$ to provide a passage for stem $S_1$, the face end of the cylinder being slotted to admit the stems inserted in the side faces of the cube.

Formed about opening $0_1$ is a raised profile $P_1$ having the outline of the symbol for numeral "1" and dimensioned to accommodate piece 1 when stem $S_1$ is inserted in the opening.

Formed respectively about openings $0_2$, $0_3$, $0_4$, and $0_5$ are raised profiles $P_2$, $P_3$, $P_4$ and $P_5$, these profiles having the outlines of the symbols for numerals "2" to "5" and being dimensioned to accommodate pieces 2 to 5 when their stems are inserted in the appropriate openings. Thus each profile serves as a socket adapted to receive a correspondingly-shaped piece. In practice, these sockets may be formed by recesses in the faces rather than by a raised profile.

The arrangement is such that when the pieces are inserted one-by-one in their proper holes and in direct numerical sequence (1 to 5), each piece will be seated in its proper socket and the stems thereof which lie within the cube will interlock so that it will not be possible to withdraw the pieces unless the pieces are retracted one-by-one in their reverse numerical sequence (5 to 1). Should the player wish to retract a piece out of sequence, he cannot succeed. To accomplish this result, the stems, except for stem $S_5$, are provided with transverse openings, as will now be explained.

As shown in FIG. 5, hollow stem $S_1$ is provided with a transverse hole $H_1$ and a transverse slot TS, which intersects the passage formed by hole $H_1$ at right angles thereto. Thus when piece 1 is inserted and then piece 2 is inserted, stem $S_2$ of piece 2 will cross through hole $H_1$ whose diameter and placement are such as to accommodate this stem.

Figure 4:
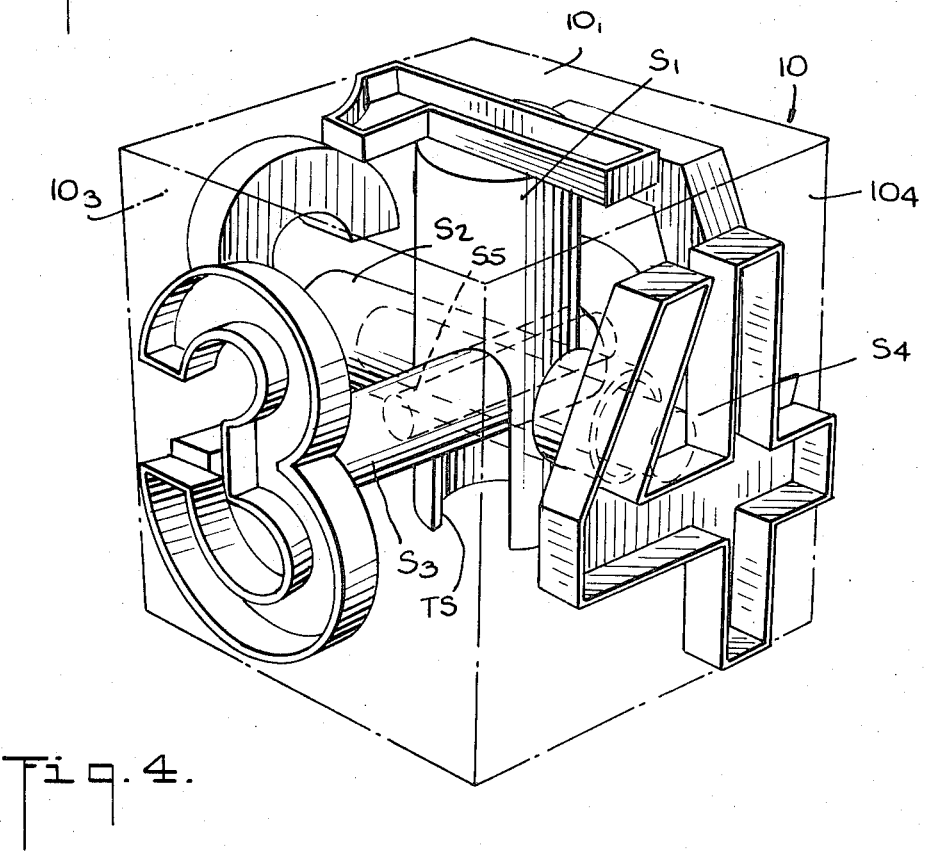
FIG. 4 is the same as FIG. 1 except that the walls of the cube are treated as transparent in order to reveal the internal relationship of the interlocking stems.
Figure 3:
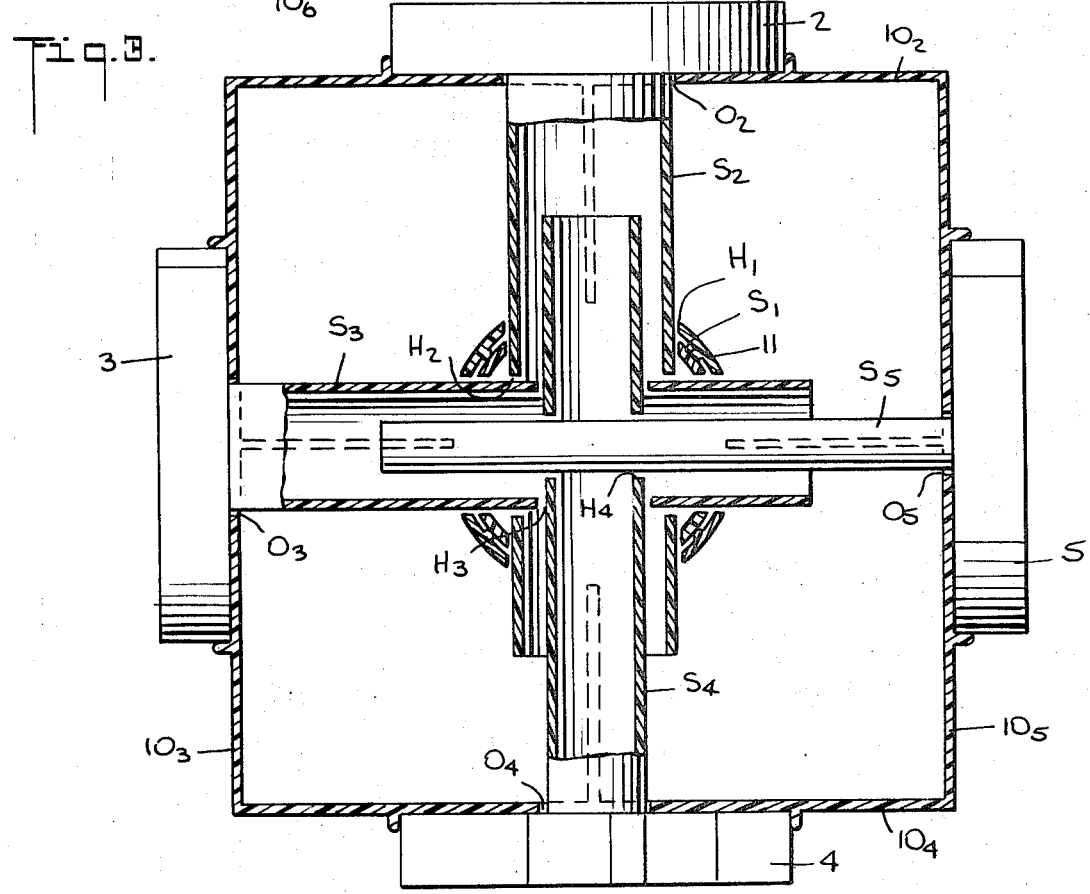
FIG. 3 is a section taken in the plane indicated by line 3—3 in FIG. 2.

The stem $S_2$ of piece 2 is provided with a transverse hole $H_2$, so positioned that when piece 3 is thereafter inserted, its stem $S_3$ passes through slot ST in stem $S_1$ (see FIG. 4) and then through hole $H_2$ (see FIG. 3).

Piece 3 has a transverse hole $H_3$ and when piece 4 is thereafter inserted, its stem $S_4$ crosses through hole $H_3$, as shown in FIG. 3. Piece 4 has a transverse hole $H_4$ therein which accommodates the stem $S_5$ of piece 5 when it is inserted.

It will be seen in FIGS. 2 and 3 that the stems, when all pieces are inserted in the cube, extend along axes which intersect at a common point and are in interlocking relationship. Thus stem $S_1$ is intersected by $S_2$ and cannot be withdrawn unless stem $S_2$ is retracted. Stem $S_2$ is intersected by stem $S_3$ and cannot be withdrawn until this stem is retracted. Stem $S_3$ is intersected by stem $S_4$ which extends coaxially within stem $S_2$ and cannot be withdrawn until stem $S_4$ is retracted. Stem $S_4$ is intersected by stem $S_5$ which extends coaxially within stem $S_3$ and stem $S_4$ cannot be withdrawn until stem $S_5$ is retracted. Stem $S_5$, however, is free.

Once the pieces are in place on the cube, they can only be removed in inverse numerical sequence, and should the child try to remove the "4" piece before retracting the "5" piece he will not succeed, for the former is locked by the latter. And unless the pieces are inserted into the cube in their proper numerical sequence, the child will not be able to mount all of the pieces. If, for example, the child first inserts a "2" piece, the stem thereof will block the later insertion of the "1" piece, but if the "1" piece is put in first, then the stem $S_2$ of the "2" piece is able to enter hole $H_1$ in the stem 1 of the "1" piece.

The five numbers in this puzzle are relatively large so that the player can acquire a sense of their symbolic shape by feel as well as visually. In the learning process, tactile experience serves to reinforce visual impressions. Since the numerals fit into the cube in one sequence only —the counting sequence— the child learns to count by symbols. The discovery of the proper sequence of insertion is acquired by trial and error, for the player must not only learn to match the shape of the piece to the shape of the socket, but he must also learn the sequence in which the pieces will be accepted by the cube. Success is gained only when these relationships are mastered by the child. But the game is not over, for now the child is challenged to remove the pieces in the reverse counting order.

By deciding where and when to place each numeral on the cube to complete the puzzle, a preschooler teaches himself an important basic skill. And once knowledge is gained of the sequential relationship of the numerical symbols 1 to 5, it becomes relatively easy to teach the child about 6 to 9.

One can of course provide a more sophisticated puzzle by a pair of cubes working on similar principles, one cube being adapted to operate with 0 to 4 pieces and the second with 5 to 9 pieces. Obviously the same approach can be taken with sets of alphabetical symbols.

While there has been shown a preferred embodiment of the invention, it will be appreciated that many changes and modifications may be made therein without departing from the spirit of the invention.

What I claim is:

1. A device for teaching preschool children to recognize and count numbers, said device comprising:
    A. a hollow cube having six like faces, the bottom face serving as a base, the top and side faces having openings therein lying within sockets having the shapes of a sequence of five numbers;
    B. a set of five pieces having the shape of said five numbers and dimensioned to be received in the correspondingly-shaped sockets; and
    C. hollow stems projecting from the rear of said pieces and insertable in said openings, said stems extending in the cube along axes which intersect at a common point, the stems on the pieces other than the piece representing the last number in the sequence having transverse holes therein which are so placed that the second stem in the sequence crosses through the passage formed by the hole in the first stem, the third stem crosses through the passage formed by the hole in the second stem and the fourth stem crosses through the passage formed by the hole in the third stem.

2. A device as set forth in claim 1 wherein said stems in the sequence have progressively smaller diameters and the openings in said faces have diameters slightly larger than the diameters of the related stems.

3. A device as set forth in claim 1, wherein said sockets are defined by raised profiles.

4. A device as set forth in claim 1, wherein said sockets are defined by recesses in the faces.

5. A device as set forth in claim 1, wherein said sequence is formed by the numbers 1 to 5.

6. A device as set forth in claim 1, wherein said stems are integral with said pieces and are formed of molded plastic material.

* * * * *